Oct. 1, 1929.　　　　R. D. MARX　　　　1,729,667
TRUCK
Filed Aug. 3, 1928
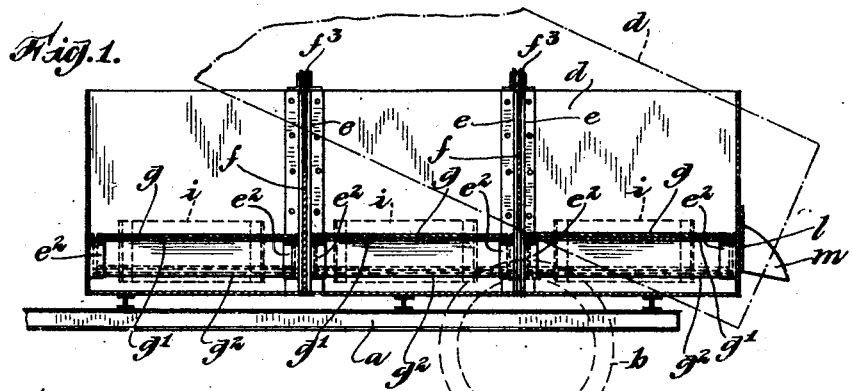
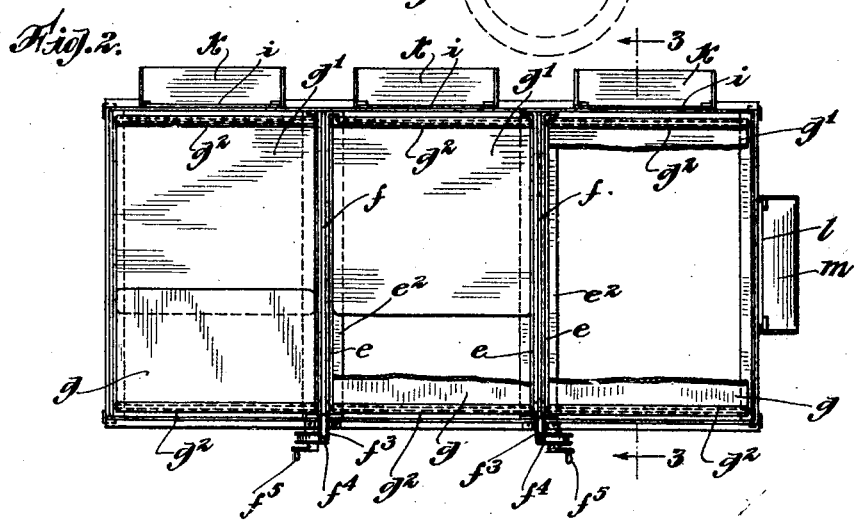
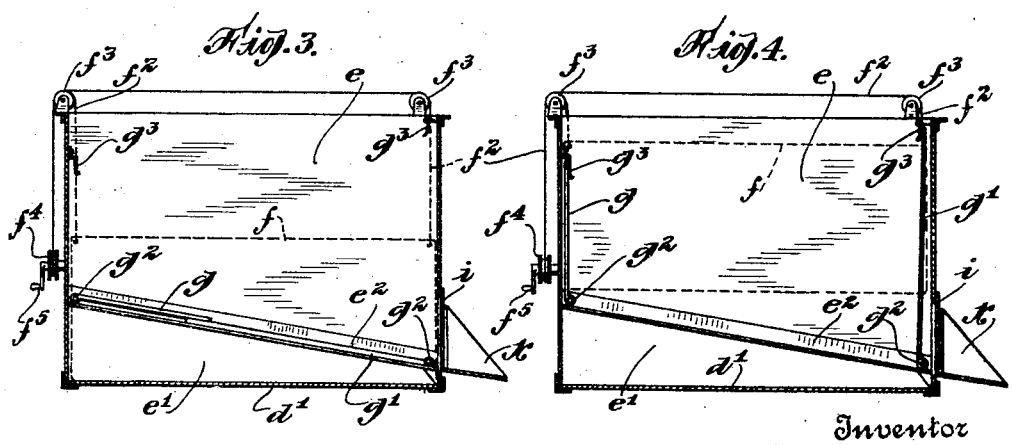

Patented Oct. 1, 1929

1,729,667

UNITED STATES PATENT OFFICE

ROBERT D. MARX, OF BROOKLYN, NEW YORK

TRUCK

Application filed August 3, 1928. Serial No. 297,359.

In another application for Letters Patent of the United States, Serial No. 297,358, filed August 3, 1928, there is described and shown an improved truck body designed particularly for the use of coal dealers and adapted for the delivery of coal or other material in relatively large quantities, by rear end discharge, or in relatively small quantities, as for family trade, by side discharge. The truck body shown in that application is provided with one or more transverse partitions which have each a fixed portion spaced from the floor at its lower edge, and a relatively movable portion, and with a floor which is tiltable to one side for the purpose of discharging the load at the side, the body being also tiltable to the rear to permit the discharge of the load below the fixed portions of the partitions when the floor is horizontal in a transverse direction.

In the development of the invention disclosed in that application it has been found that the special requirements which that body was designed to meet can also be met by a different construction which is the subject of the present application. In this different construction the truck body is provided with a fixed floor, with one or more partitions which comprises each a fixed portion spaced at its lower edge from the floor, and a relatively movable portion, and with a false floor which can be supported in a laterally inclined position and can also be retained in a vertical position. The body is tiltable to the rear to permit rear end discharge of the entire contents of the body on the fixed floor and the false floor provided for each compartment of the body, can be laid upon its supporting means in a laterally inclined position to permit discharge of the contents of the compartment at the side.

The invention will be more fully explained hereinafter with reference to the accompanying drawings in which it is illustrated as embodied in a convenient and practical form, and in which:

Figure 1 is a view in longitudinal section of the truck body constructed in accordance with the invention, a portion of the chassis or body support, on which it is tiltable, being also shown.

Figure 2 is a top view of the same, with the false floor partly broken away in two of the three compartments shown.

Figure 3 is a view in transverse section on the plane indicated by the broken line 3—3 of Figure 2 with the false floor in position for side discharge.

Figure 4 is a view similar to Figure 3 but with the false floor turned up.

Figure 1 of the drawing shows so much of an ordinary form of truck as is necessary to enable the application of the invention to be understood, the invention not being concerned with the general features of construction of the truck, except as hereinafter indicated. The truck represented has an ordinary chassis or supporting framework $a$ mounted on wheels one of which is indicated at $b$, the body $d$ being adapted to be tilted to the rear by any suitable means, not necessary to be shown or described herein, for the purpose of discharging the load at the rear end.

In the embodiment of the invention illustrated the body $d$ is shown as divided into three compartments by two transverse partitions, but it will be understood that a greater number of partitions may be provided. Each of such partitions, in the embodiment of the invention illustrated, comprises a fixed member or portion $e$ and a relatively movable portion $f$. Preferably, and for convenience, the fixed portion $e$ is double and the relatively movable portion $f$ is arranged for vertical movement between the two parts $e, e$ of the fixed portion. The fixed portion $e$ is spaced at its lower edge from the fixed floor $d^1$, but is cut away at its lower edge, as indicated at $e^1$, so as to leave an opening between it and the fixed floor $d^1$. The relatively movable portion $f$ of the partition, if a relatively movable portion be provided, may be arranged for bodily vertical movement, to be raised or lowered by means of cables $f^2$ connected to the member $f$ between the partition walls $e, e$, passing over guide pulleys $f^3$ and connected to a drum $f^4$, suitably supported on the side of the body and provided with a crank $f^5$ for operation. In the construction shown each fixed partition member $e$ is provided either at or near its lower edge, on the side toward the compartment, with an angle iron $e^2$ which is inclined from one side of the body toward the other at an angle suitable for the movement of the load toward the side.

Each compartment is provided with a false floor, which for convenience may be formed in two parts $g$, $g^1$, hingedly supported, as at $g^2$, on the cross walls of the compartment. When the compartments are to receive a quantity of material for side delivery the false floors are laid down for support in a laterally inclined position, as by the angle irons $e^2$ above mentioned, but when the truck body is to receive a load for rear end discharge the false floors are turned up into vertical position in which they may be retained, if desired, by suitable latches indicated at $g^3$. For each compartment formed by the transverse partitions there is provided a suitable opening with a gate, as at $i$, and a discharge chute $k$. The rear end of the body is also provided with a discharge opening and gate, as at $l$, and a discharge chute, as at $m$. When the truck is to be sent out with a load sufficient to fill the entire body the false floors are swung up into vertical position and the movable partitions, if they are of such a character as to extend below the cut away edge of the fixed partitions, are raised so as to leave a clear way below the fixed partitions for the discharge of the entire load at the rear end of the body when the body is tilted, as represented by broken lines in Figure 1. If, however, the truck is to be sent out with several small quantities of coal to be delivered, perhaps to different customers, the false floors $g$, $g^1$ are laid down upon their supports and the compartments are then filled. The contents of each compartment can then be discharged at the side of the truck in the usual manner.

The movable portions of the partitions serve no purpose when the several compartments are separately filled, or when the entire body is filled with a load of material for delivery at one time or place, the movable portions being then raised above the fixed floor, but if some of the compartments are to receive together a load for rear end discharge while other compartments are to receive a load or loads for side discharge, one or more of the movable portions may be lowered for contact with the fixed bottom of the truck body to separate the compartments as may be required.

It will be understood that details of construction can be varied to suit the convenience of the manufacturer or of the user, and that the invention, except as pointed out in the accompanying claims, is not restricted to the particular construction shown and described herein.

I claim as my invention:

1. In a truck body having fixed side walls and floor, a transverse partition spaced at its lower edge from the floor, a movable false floor, and means to support the false floor in a laterally inclined position on the partition.

2. In a truck body having fixed side walls and floor, a transverse partition comprising a relatively fixed portion spaced at its lower edge from the floor, a relatively movable portion, a movable false floor, and means to support the false floor in a laterally inclined position on the partition.

3. In a truck body having fixed side walls and floor, a transverse partition spaced at its lower edge from the floor, a movable false floor, means to support the false floor in a laterally inclined position on the partition, and means to retain the false floor in a vertical position.

This specification signed this 2d day of Aug., A. D. 1928.

ROBERT D. MARX.